(12) United States Patent
Xu et al.

(10) Patent No.: US 11,550,736 B1
(45) Date of Patent: Jan. 10, 2023

(54) TENSORIZED DIRECT MEMORY ACCESS DESCRIPTORS

(71) Applicant: Amazon Technologies, Inc., Seattle, WA (US)

(72) Inventors: Kun Xu, Austin, TX (US); Ron Diamant, Santa Clara, CA (US); Ilya Minkin, Los Altos, CA (US); Mohammad El-Shabani, Redwood City, CA (US); Raymond S. Whiteside, Austin, TX (US); Uday Shilton Udayaselvam, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,581

(22) Filed: Sep. 30, 2021

(51) Int. Cl.
*G06F 13/16* (2006.01)
*G06N 3/04* (2006.01)
*G06F 13/30* (2006.01)

(52) U.S. Cl.
CPC ...... *G06F 13/1663* (2013.01); *G06F 13/1668* (2013.01); *G06F 13/30* (2013.01); *G06N 3/04* (2013.01)

(58) Field of Classification Search
None
See application file for complete search history.

(56) References Cited

U.S. PATENT DOCUMENTS

| 8,733,860 B1 * | 5/2014 | Burke | B65G 1/127 |
| | | | 312/134 |
| 2014/0189169 A1 * | 7/2014 | Litch | G06F 13/28 |
| | | | 710/22 |

* cited by examiner

*Primary Examiner* — Michael Sun
(74) *Attorney, Agent, or Firm* — Weaver Austin Villeneuve & Sampson LLP

(57) ABSTRACT

To reduce direct memory access (DMA) overhead, a tensorized descriptor can be used to generate a series of memory descriptors to perform a series of DMA data transfers. The tensorized descriptor may include attributes such as a stride and a memory descriptor template, which can be used to generate the series of memory descriptors. Hence, instead of having to retrieve each of the memory descriptors to perform the series of DMA transfers, a single tensorized descriptor can be retrieved to perform a series of data transfers.

20 Claims, 10 Drawing Sheets

TENSORIZED DIRECT MEMORY ACCESS DESCRIPTORS

BACKGROUND

Neural networks can be trained using machine learning techniques to perform a certain computing task for an application. The trained neural network can then perform the computing task, for example, to generate an inference from input data. Computing tasks that neural networks can perform may include human-like functions such as visual and audial perception, natural language processing, etc.

BRIEF DESCRIPTION OF THE DRAWINGS

Various embodiments in accordance with the present disclosure will be described with reference to the drawings, in which.

DETAILED DESCRIPTION

Figure 1:
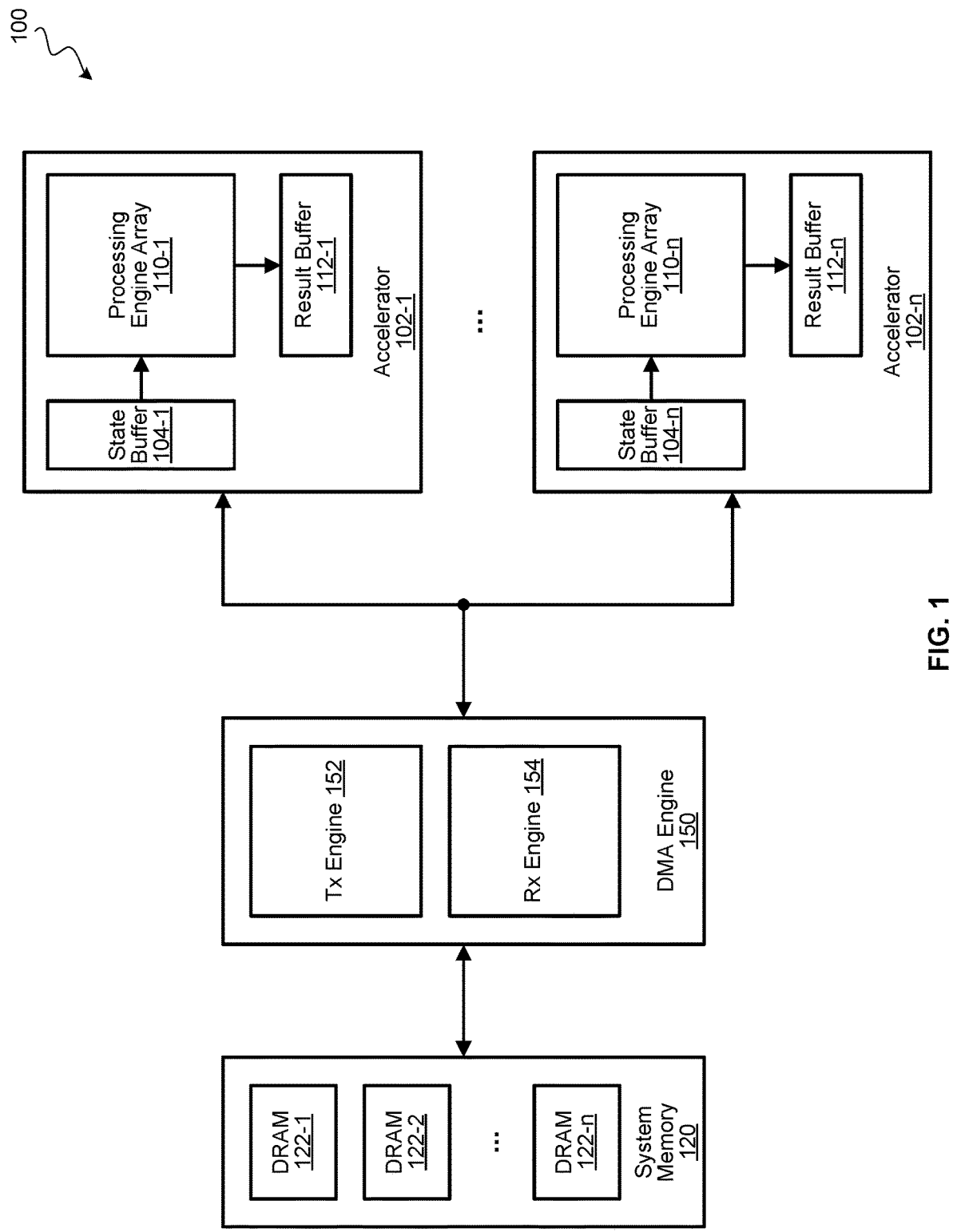
FIG. 1 illustrates a block diagram of an example of a computing system.

Training a neural network and/or performing inference on an accelerator may involve transferring data between the accelerator and system memory (e.g., dynamic random access memory (DRAM)). These data transfers are performed because the local memory of the accelerator may lack sufficient storage capacity to store an entire neural network model. Training may also involve exchanging a large number of weight gradients. In systems with multiple accelerators, the weight gradients can be copied to system memory to facilitate the data exchange. To improve latency and throughput, the data transfers between an accelerator and system memory can be performed using direct memory access (DMA) to limit the involvement of the host processor. However, DMA utilizes memory descriptors to perform the data transfers, and retrieving the memory descriptors incurs additional overhead for the DMA transfers.

By way of example, an end-to-end DMA transfer may utilize two memory descriptors (one memory descriptor to read the data from the source, and one memory descriptor to write the data to the destination). Each memory descriptor can be, for instance, 16 bytes in length. For a data transfer of 256 bytes, the DMA overhead is hence (2*32 bytes)/256 bytes or 12.5%. As the data transfer size becomes smaller, the advantage of using DMA diminishes due to the overhead of retrieving the memory descriptors. The data being transferred between the accelerator and system memory are not necessarily stored contiguously in the accelerator's local memory. As such, increasing the data transfer size per data transfer may not be possible. As a result, a large number of small data transfers between the accelerator and system memory may be performed.

To reduce the overhead of performing a large number of DMA transfers, the techniques disclosed herein tensorize the memory descriptors used by DMA. Tensorization may refer to the transformation or mapping of lower-order data to higher-order data. For instance, the techniques disclosed herein can transform a base descriptor into a series of memory descriptors to effectuate a large number of data transfers stemming from the base descriptor. The base descriptor from which the series of memory descriptors are generated can be referred to as a tensorized descriptor. Tensorization of the memory descriptors can significantly reduce the overhead and memory bandwidth used to retrieve the memory descriptors. For example, instead of having to retrieve hundreds or thousands of memory descriptors, a single tensorized descriptor can be retrieved to effectuate hundreds or thousands of DMA transfers. Tensorization of the memory descriptors also reduces the amount of memory needed to store the memory descriptors because the hundreds or thousands of memory descriptors can be condensed into a single tensorized descriptor. The physical size of the DMA engine can also be reduced because the size of the descriptor buffer within the DMA engine can be reduced. Instead of having to buffer hundreds of memory descriptors, the DMA engine may only need to buffer a few descriptors to transfer a large amount of data.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100. Computing system 100 includes a DMA engine 150, a system memory 120, and one or more accelerators 102-1 to 102-n. Computing system 100 may include other components not specifically shown, such as a host processor. Accelerator 102-1 can be a neural network accelerator (e.g., a neural network processor, tensor processing unit, etc.), and may include a processing engine array 110-1 (e.g., a systolic array), a state buffer 104-1, and a result buffer 112-1. Processing engine array 110-1 may include an array of processing engines arranged in rows and columns. Each processing engine is capable of performing a multiply-and-add operation (e.g., to perform matrix multiplication operations for a neural network model). State buffer 104-1 is used to store input data such as feature map values and weight values for processing engine array 110-1. During operation, the input data are shifted into processing engine array 110-1 from state buffer 104-1 along the rows of the array. The computation results of the processing engines are accumulated along the column direction, and the column output data are stored in result buffer 112-1. Other accelerators in computing system 100 such as accelerator 102-n may have a similar architecture as accelerator 102-1.

In most instances, tensors processed by computing system 100 may have thousands or even millions of elements. Because not all elements of a tensor can fit within accelerators 102-1 to 102-n at the same time, system memory 120 can be used to store data that are not currently being processed in accelerators 102-1 to 102-n. System memory 120 can also be used to facilitate data exchanges between accelerators 102-1 to 102-n (e.g., gradient exchange during training). As computations are carried out, data needed by accelerators 102-1 to 102-n can be transferred from system memory 120 into the respective accelerator, and data no longer needed by accelerators 102-1 to 102-n can be transferred from the respective accelerator to system memory 120. System memory 120 can be implemented using one or more dynamic random access memory (DRAM) devices 122-1 to 122-n and/or other types of memories. In other implementations, system memory can be implemented, for example, with static random access memory (SRAM), flash memory, 3D cross-point memory, or any combination thereof.

Data transfers between system memory 120 and other components of computing system 100 may involve a host processor (not shown) to issue read and write commands to system memory 120. Such memory accesses through a host processor may incur unnecessary latency, especially when the host processor is not a consumer or generator of the data being accessed. To bypass the host processor, DMA engine 150 can be used to directly exchange data between system memory 120 and accelerators 102-1 to 102-n. DMA engine 150 may include a transmit (Tx) engine 152 and a receive (Rx) engine 154. Tx engine 152 can be used by DMA engine 150 to obtain data (e.g., to read data from the local memories of accelerators 102-1 to 102-n such as their state buffer, result buffer, etc.), and the Rx engine 154 can be used by the DMA engine to provide data (e.g., to write data to system memory 120, etc.). Tx engine 152 and Rx engine 154 can operate independently, and the connectivity and directionality of data transfers can be flexible by using the two engines. It should also be noted that although only one DMA engine 150 is shown, computing system 100 may include additional DMA engines, and each DMA engine can be allocated for data transfers between a certain subset of components.

Figure 2:
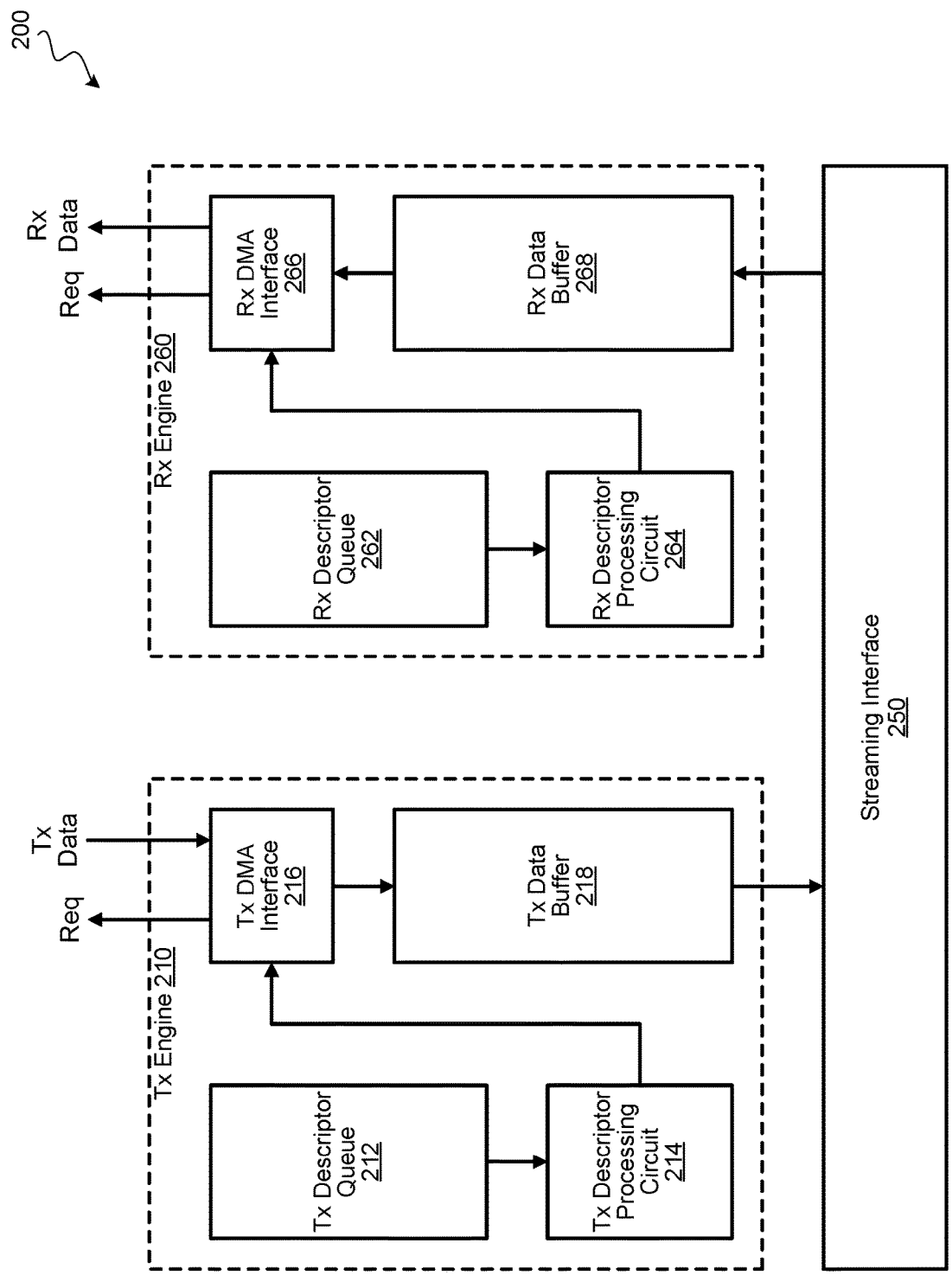
FIG. 2 illustrates a block diagram of an example of a direct memory access (DMA) engine.

FIG. 2 illustrates a more detailed block diagram of an example of a DMA engine 200. DMA engine 200 is a type of integrated circuit device that can perform data transfers between components of a computing system without direct involvement of a host processor. DMA engine 200 can be one implementation of DMA engine 150 in computing system 100. DMA engine 200 may include a Tx engine 210 and a Rx engine 260 coupled to a streaming interface 250. Tx engine 210 and Rx engine 260 can operate independently from each other. In some implementations, data from Tx data buffer 218 can be streamed to Rx data buffer 268 via streaming interface 250. In some implementations, streaming interface 250 can also be coupled to other components of a computing system to allow other components to obtain data from streaming interface 250 or to provide data to streaming interface 250.

Tx engine 210 may include a Tx descriptor queue 212, a Tx descriptor processing circuit 214, a Tx DMA interface 216, and a Tx data buffer 218. Tx descriptor queue 212 is a descriptor buffer/FIFO that stores a set of descriptors pending processing by DMA engine 210. In some implementations, Tx descriptor FIFO 212 can be implemented as a ring queue. A head pointer can be used to indicate the location of the next descriptor to process, and a tail pointer can be used to indicate the location of the last descriptor available in the queue. As descriptors are process and descriptors are added to Tx descriptor FIFO 212, the head and tail pointers can be updated.

Tx descriptor processing circuit 214 is configured to process descriptors retrieved from Tx descriptor queue 212. For example, Tx descriptor processing circuit 214 may retrieve a descriptor from descriptor queue 212, and parse the descriptor to determine the descriptor type of the descriptor to take the appropriate actions. In some implementations, DMA engine 200 may support different types of descriptors such as metadata descriptors and memory descriptors. Metadata descriptors can be used to pass information to DMA engine 200 (e.g., to configure DMA engine 200), whereas memory descriptors can be used to perform data transfers. If the descriptor retrieved from Tx descriptor queue 212 is a memory descriptor, Tx descriptor processing circuit 214 may provide the memory descriptor to Tx DMA interface 216 to perform the requested data transfer. In some implementations, if the descriptor retrieved from Tx descriptor queue 212 is a tensorized descriptor, Tx descriptor processing circuit 214 may generate a series of memory descriptors based on the tensorized descriptor, and sequentially provide each of the generated memory descriptors to Tx DMA interface 216.

By way of example, Tx descriptor processing circuit 214 can be operable to obtain a tensorized descriptor having a header and a template from Tx descriptor queue 212. In some implementations, the tensorized descriptor may occupy multiple descriptor entries in the descriptor queue. Tx descriptor processing circuit 214 can then sequentially generates multiple memory descriptors having the template of the tensorize descriptor according to attributes in the header, and provide the Tx DMA interface 216 with each of the multiple memory descriptors to perform data transfers according to the memory descriptors.

Tx DMA interface 216 is configured to perform data transfers based on memory descriptors provided from Tx descriptor processing circuit 214. For example, a memory descriptor provided by Tx descriptor processing circuit 214 may include a data transfer size or data length, and an address indicating the location of the data. Tx DMA interface 216 may send a request to the component of the computing system mapped to the address indicated in the memory descriptor to obtain the data length amount of data from that address. The data obtained from the address is then written into Tx data buffer 218. Streaming interface 250 may read the data stored in Tx data buffer 218 and provide that data to the intended data consumer.

Rx engine 260 may include a Rx descriptor queue 262, a Rx descriptor processing circuit 264, a Rx DMA interface 266, and a Rx data buffer 268. The components of Rx engine 260 operate in a similar manner as Tx engine 210 with the exception that instead of obtaining data from components of a computing system, Rx DMA interface 266 is used for transferring data to components of the computing system. For example, in response to a memory descriptor provided by Rx descriptor processing circuit 264, Rx DMA interface 216 may read data from Rx data buffer 268 provided by streaming interface 250, and transfer that data to a component of the computing system. The amount of data being read can be indicated by a data length provided in the memory descriptor, and Rx DMA interface 266 may write that data to the address provided in the memory descriptor.

Figure 3:
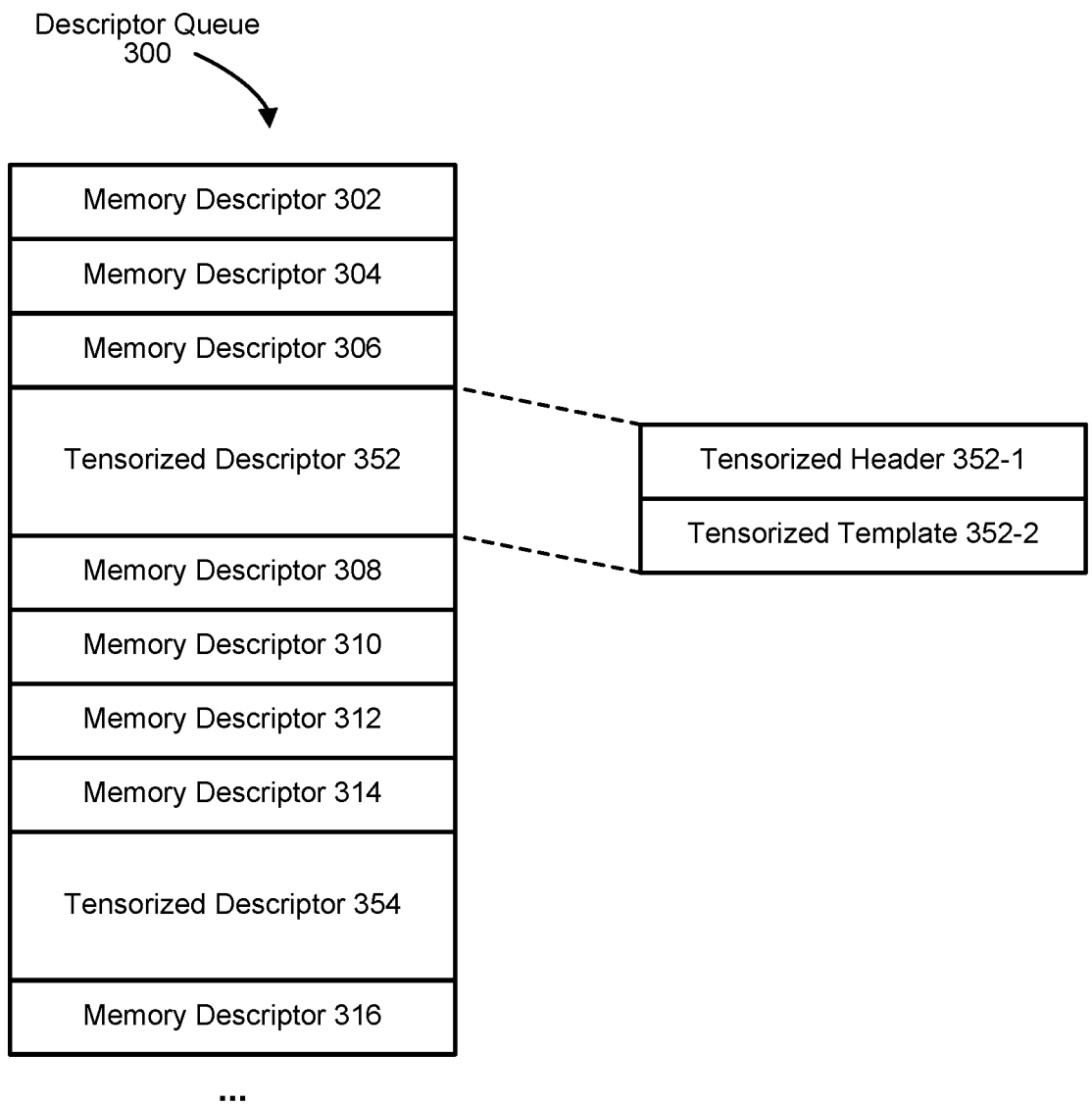
FIG. 3 illustrates a conceptual diagram of an example of a descriptor queue.

FIG. 3 illustrates a conceptual diagram of an example of a descriptor queue 300. Descriptor queue 300 can be, for example, Tx descriptor queue 212 or Rx descriptor queue 262. Descriptor queue 300 may store a mixture of different types of descriptors. For example, descriptor queue may store memory descriptors 302, 304, 306, 308, 310, 312, 314, and 316. Descriptor queue may also store tensorized descriptors 352 and 354. In addition, descriptor queue 300 may store other metadata descriptors not specifically shown.

A tensorized descriptor may occupy more bytes than a memory descriptor, and can be composed of multiple descriptors. For example, in some implementations, a memory descriptor may occupy 16 bytes, and a tensorized descriptor may occupy 32 bytes and be composed of two descriptors. A tensorized descriptor may occupy more bytes than a memory descriptor, because a tensorized descriptor may include a tensorized header and a tensorized template (e.g., tensorized descriptor 352 may include tensorized header 352-1 and tensorized template 352-2). The tensorized template of a tensorized descriptor resembles a normal memory descriptor, and thus the tensorized template may occupy the same number of bytes as a normal memory descriptor. The tensorized header provides tensorized attributes that can be used to generate a series of memory descriptors based on the tensorized template. In some implementations, to keep the number of bytes consistent when reading descriptors from descriptor queue 300 and to simplify the pointer updates, the tensorized header may occupy the same number of bytes as a normal memory descriptor, or occupy an integer multiple of the number of bytes as a normal memory descriptor.

According to some implementations, a descriptor processing circuit (e.g., Tx descriptor processing circuit 214, Rx descriptor processing circuit 264) may retrieve a descriptor corresponding to a certain number of bytes (e.g., 16 bytes) at a time to process. If the descriptor retrieved by the descriptor processing circuit is a normal memory descriptor, the descriptor processing circuit may provide the memory descriptor to the DMA interface to perform the corresponding data transfer. If the descriptor retrieved by the descriptor processing circuit is a tensorized header (which can be considered as a type of metadata descriptor), the descriptor processing circuit may store the tensorized attributes provided in the tensorize header, and retrieve the next descriptor from descriptor queue 300 to process. In some implementations, the next descriptor following the tensorized header is expected to be a tensorized template, and the descriptor processing circuit may generate a series of memory descriptors having the same template as the tensorized template according to the attributes provided in the tensorized header.

Figure 4:
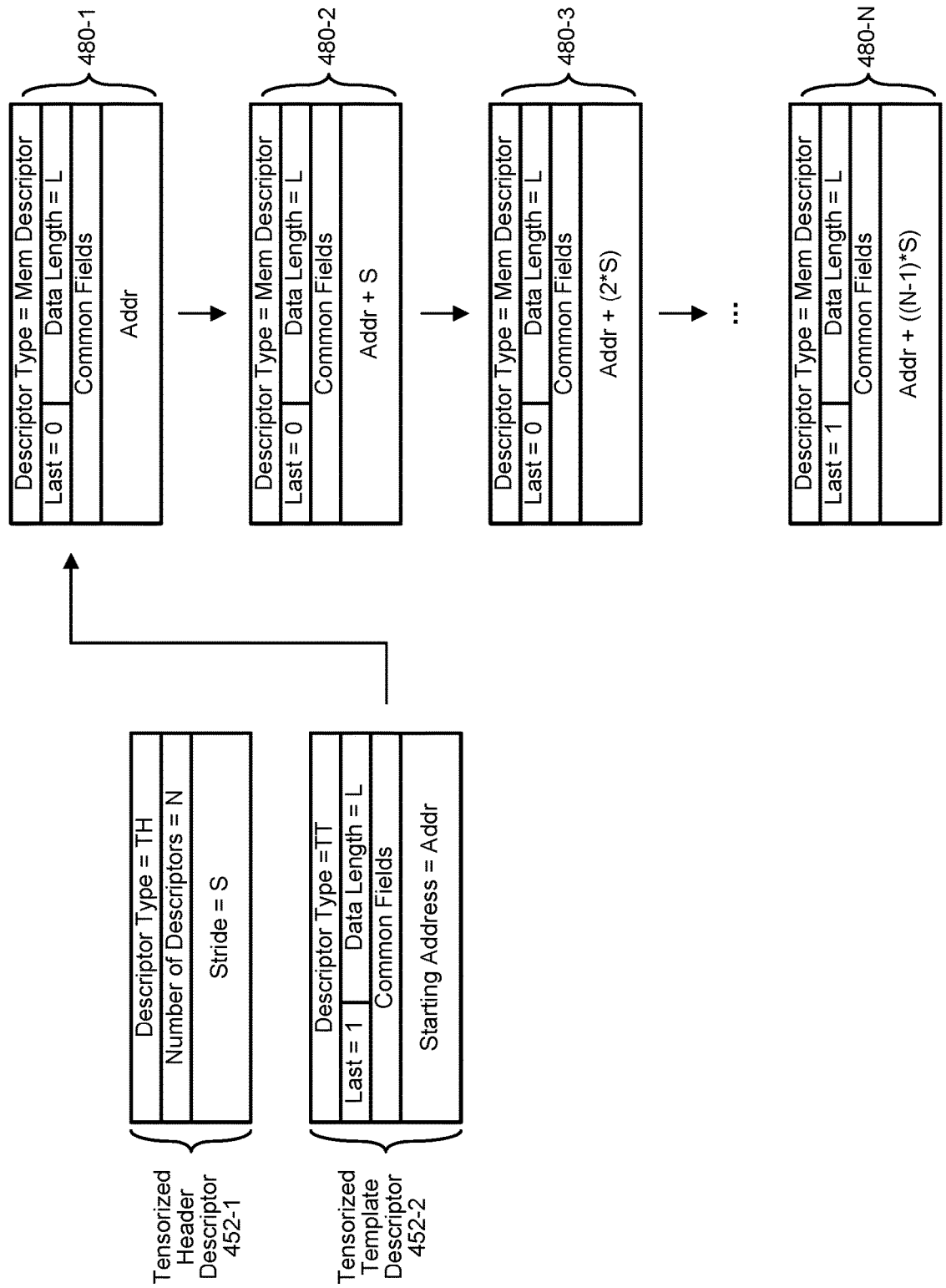
FIG. 4 illustrates a conceptual diagram of an example of processing a tensorized descriptor.

FIG. 4 illustrates a conceptual diagram of an example of processing a tensorized descriptor (e.g., tensorized descriptor 352). As described above, a tensorized descriptor may include a tensorized header 452-1 and a tensorized template 452-2. Tensorized header 452-1 may include a descriptor type to identify tensorized header 452-1 as a tensorized header (TH). The descriptor type of tensorized header 452-1 may include a metadata indicator bit that is set to indicate tensorized header 452-1 is a type of metadata descriptor, and a tensorized descriptor indicator bit that is set to indicate tensorized header 452-1 is part of a tensorized descriptor.

Tensorized header 452-1 may also include a field to indicate the number of memory descriptors to generate from the tensorized descriptor and a stride field to indicate a stride to offset the address for each successive memory descriptor being generated. In some implementations, the stride value stored in the stride field can be defined using a number of bits that spans a full address range of the computing system. In other words, the number of bits occupied by the stride field may be sufficient to span the entire address range of the computing system. By way of example, the stride field may occupy 64 bits to cover a 64-bit address range. Such implementations may allow the memory descriptors generated from the tensorized descriptor to cover addresses mapped to multiple accelerators of the computing system such that data can be distributed to each of the accelerators. In other words, this may allow an address of a generated memory descriptor to be mapped to a first accelerator, and an address of another generated memory descriptor to be mapped to a second accelerator. In some implementations, the stride field can be implemented as a multi-dimensional stride. For example, the stride can be a two-dimensional stride indicating a memory row offset and a memory column offset. As another example, the stride can be a three-dimensional stride indicating a memory partition offset, a memory row offset, and a memory column offset.

In some implementations, tensorized header 452-1 may include additional fields not specially shown. For example, tensorized header 452-1 may include a tensorization length indicating the total amount of data being transferred using the tensorized descriptor. The tensorization length can be equal to the data length indicating a data transfer size of a memory descriptor multiplied by the number of memory descriptors to generate. The tensorization length can be used, for example, to allocate sufficient space in the data buffer of the DMA engine to store the data obtained by the DMA engine using the tensorized descriptor, or to request sufficient data in the data buffer to provide the DMA engine with data to transfer using the tensorized descriptor. Tensorized header 452-1 may also include packetization parameters. For example, in some implementations, a descriptor such as a tensorized descriptor may occupy multiple descriptors, and the packetization parameters may include a concatenation indicator bit to indicate that tensorized header 452-1 is concatenated with additional descriptor(s) to form a descriptor packet, and a first position indicator bit to indicate that tensorized header 452-1 is the first descriptor in the descriptor packet.

Tensorized template 452-2 may include a descriptor type to identify tensorized template 452-2 as a tensorized template (TT). The descriptor type of tensorized template 452-2 may include similar fields as tensorized header 452-1. For example, the descriptor type may include a metadata indicator bit that is cleared to indicate tensorized template 452-2 is not a metadata descriptor but instead resembles a memory descriptor, and a tensorized descriptor indicator bit that is set to indicate tensorized template 452-2 is part of a tensorized descriptor.

Tensorized template 452-2 may have a structure and fields that resemble those of a normal memory descriptor. For example, tensorized template 452-2 may include a data length field to indicate the data transfer size requested by a memory descriptor, and a starting address indicating the address of the first memory descriptor generated from the tensorized descriptor. In some implementations, tensorized template 452-2 may include a metadata field that includes a last position indicator bit to indicate tensorized template 452-2 is the last descriptor of the descriptor packet forming the tensorized descriptor. In addition, tensorized template 452-2 may include a set of common fields that are common to all the memory descriptors being generated from the tensorized descriptor. The common fields may include, for example, an operation type to indicate the type of data transfer operation being requested (e.g., data copy, transpose, etc.), and a datatype indicating the type of data being transferred, etc.

Given the set of tensorized attributes in tensorized header 452-1 and the memory descriptor template of the tensorized template 452-2, a series of memory descriptors 480-1 to 480-N can be generated based on the tensorized descriptor. For example, the descriptor processing circuit (e.g., Tx descriptor processing circuit 214, Rx descriptor processing circuit 264) of a DMA engine may include descriptor generation circuitry that is activated in response to tensorized header being retrieved from a descriptor queue (as indicated by the descriptor type). The set of tensorized attributes from tensorized header 452-1 can be stored, and be used to configure the descriptor generation circuitry.

For instance, the descriptor generation circuitry of the descriptor processing circuit may include a counter to track the number of memory descriptors being generated for a tensorized descriptor. The field in tensorized header 452-1 indicating the number of memory descriptors to generate can be used to configure the upper limit for the counter. The counter can be incremented for each memory descriptor that is generated, and when the counter reaches the upper limit set by the field in tensorized header 452-1, the descriptor generation circuitry can be disabled to cease generation of memory descriptors until another tensorized header is retrieved by the descriptor processing circuit. The descriptor generation circuitry may also include an adder circuit that is operable to calculate addresses for the memory descriptors being generated. The stride field in tensorized header 452-1 can be used to determine a value that is added to each successive address to generate the addresses for the memory descriptors being generated.

Upon obtaining the set of tensorized attributes from tensorized header 452-1, the descriptor processing circuit may retrieve tensorized template 452-2 from the descriptor queue. To generate memory descriptor 480-1, the descriptor generation circuitry can use tensorized template 452-2 as a template, and modifies the descriptor type to indicate a memory descriptor (e.g., by clearing the tensorized descriptor indicator bit). The descriptor generation circuitry may also clear a metadata field such as the last position indicator bit of tensorized template 452-2 to generate memory descriptor 480-1. The other fields (e.g., data length, common fields, and address) of memory descriptor 480-1 may remain the same as tensorized template 452-2. Hence, the starting address provided in tensorized template 452-2 is used as the address for memory descriptor 480-1. Memory descriptor 480-1 generated by the descriptor generation circuitry may then be provided to the DMA interface of the DMA engine to perform the data transfer according to memory descriptor 480-1 (e.g., to read or write the data length amount of data at the address indicated in memory descriptor 480-1).

After generating memory descriptor 480-1, the descriptor generation circuitry of the descriptor processing circuit can generate the next memory descriptor 480-2. To generate the next memory descriptor 480-2, the descriptor generation circuitry can offset the address of memory descriptor 480-1 using the stride indicated in tensorized header 452-1 (e.g., by incrementing the address of memory descriptor 480-1 with the stride). Memory descriptor 480-2 generated by the descriptor generation circuitry may then be provided to the DMA interface of the DMA engine to perform the data transfer according to memory descriptor 480-2 (e.g., to read or write the data length amount of data at the address indicated in memory descriptor 480-2). This process of generating a memory descriptor (e.g., by offsetting the address of the previous memory descriptor with the stride) is repeated to generate memory descriptors 480-3 to 480-N. For the last memory descriptor 480-N, if this is the last memory descriptor f a descriptor packet, a metadata field such as the last position indicator bit is set to indicate that this is the last memory descriptor being generated for the tensorized descriptor and that this is the last memory descriptor of a descriptor packet.

It should be noted that in some implementations, each memory descriptor is generated on the fly and is processed to effectuate the corresponding data transfer before the next memory descriptor is generated. In this manner, the DMA engine need not allocate additional buffer storage to store more than one generated memory descriptor. In other words, DMA engine may only need to store one generated memory descriptor at a time. The descriptor processing circuit of the DMA engine may sequentially generate a memory descriptor, provide the generated memory descriptor to the DMA interface to perform the data transfer, and then generate the next memory descriptor.

Figure 5:
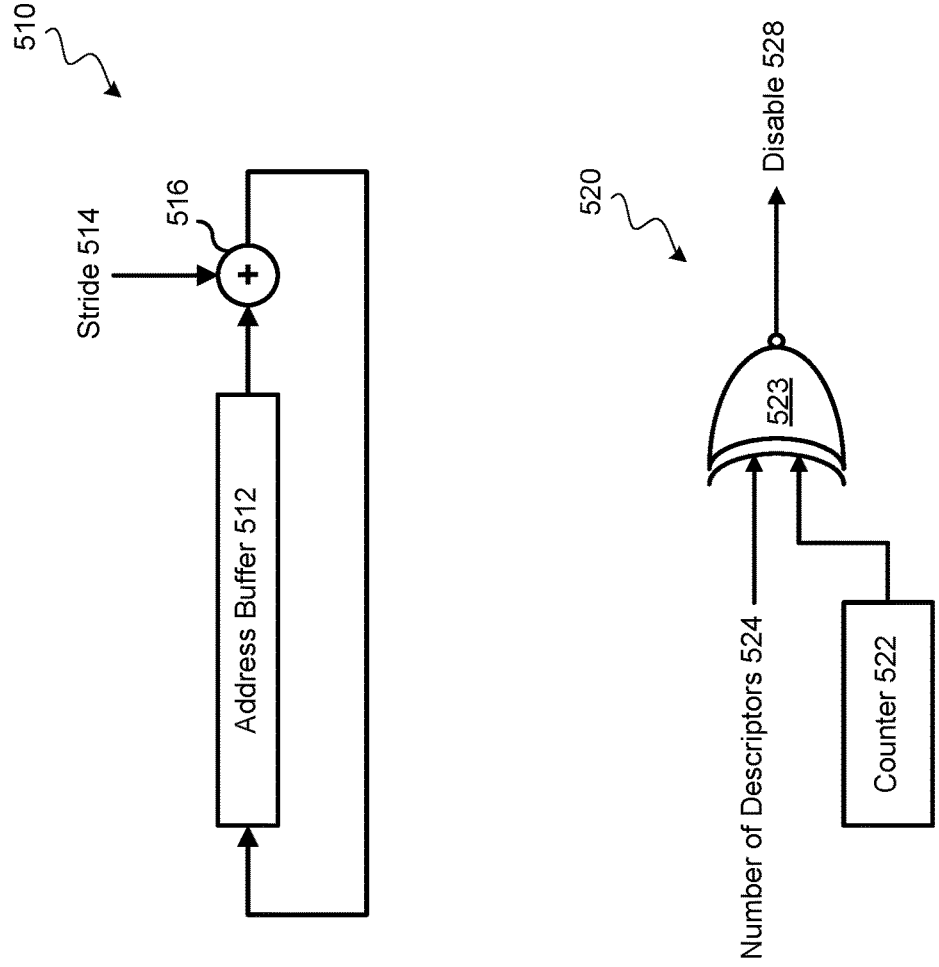
FIG. 5 illustrates an example of components of descriptor generation circuitry of a descriptor processing circuit.

FIG. 5 illustrates an example of components of descriptor generation circuitry of a descriptor processing circuit (e.g., Tx descriptor processing circuit 214, Rx descriptor processing circuit 264). The components of descriptor generation circuitry can be used, for example, to implement a memory descriptor generator. The descriptor generation circuitry may include an address generator circuit 510 and a descriptor counter circuit 520. Address generator circuit 510 may include an address buffer 512 and an adder circuit 516. Address buffer 512 can be used to store the address of the current memory descriptor being generated. Address buffer 512 can be initially loaded with the starting address provided in a tensorized template, which is used as the address in the first memory descriptor being generated for the tensorized descriptor.

To generate the address for the next memory descriptor, a stride 516 can be added to the address stored in address buffer 512 by adder circuit 516. Stride 516 can be, for example, the stride value provided in the tensorized header. For implementations that utilizes a multi-dimensional stride, stride 516 can be a value calculated from the multi-dimensional stride. For instance, with a two-dimensional stride having a memory row offset and a memory column offset, stride 516 can be calculated by adding the memory row offset to the result of multiplying the memory column offset by the row size. As another example, with a three-dimensional stride having a memory partition offset, a memory row offset, and a memory column offset, stride 516 can be calculated by adding the result of multiplying the memory partition offset by the partition size to the result of adding memory row offset to the multiplication of the memory column offset with the row size.

Descriptor counter circuit 520 may include a counter 522 that is initialized to a reset value when the descriptor processing circuit retrieves a tensorized header. Counter 522 may increment for each memory descriptor that is generated. The output of counter 522 can be compared with the number of descriptors 524 obtained from the tensorized header using a multibit XNOR circuit 523. When the counter value reaches the number of descriptors 524 indicating the last memory descriptor is being generated, the output of multibit XNOR circuit 523 is asserted, and the XNOR output can be used to generate a disable signal 528 to disable the descriptor generation circuit to terminate generation of the memory descriptors for the current tensorized descriptor.

It should be understood that the circuitry shown in FIG. 5 is just an example, and that other implementations can use different circuitry to implement the functionality of the descriptor generation circuitry. For instance, counter 522 can be a countdown counter, and the countdown counter can be initialized to the number of descriptors to generate. The countdown counter can be decremented each time a memory descriptor is generated, and the counter value can be used to generate a disable signal to terminate generation of the memory descriptors for the current tensorized descriptor.

Figure 6:
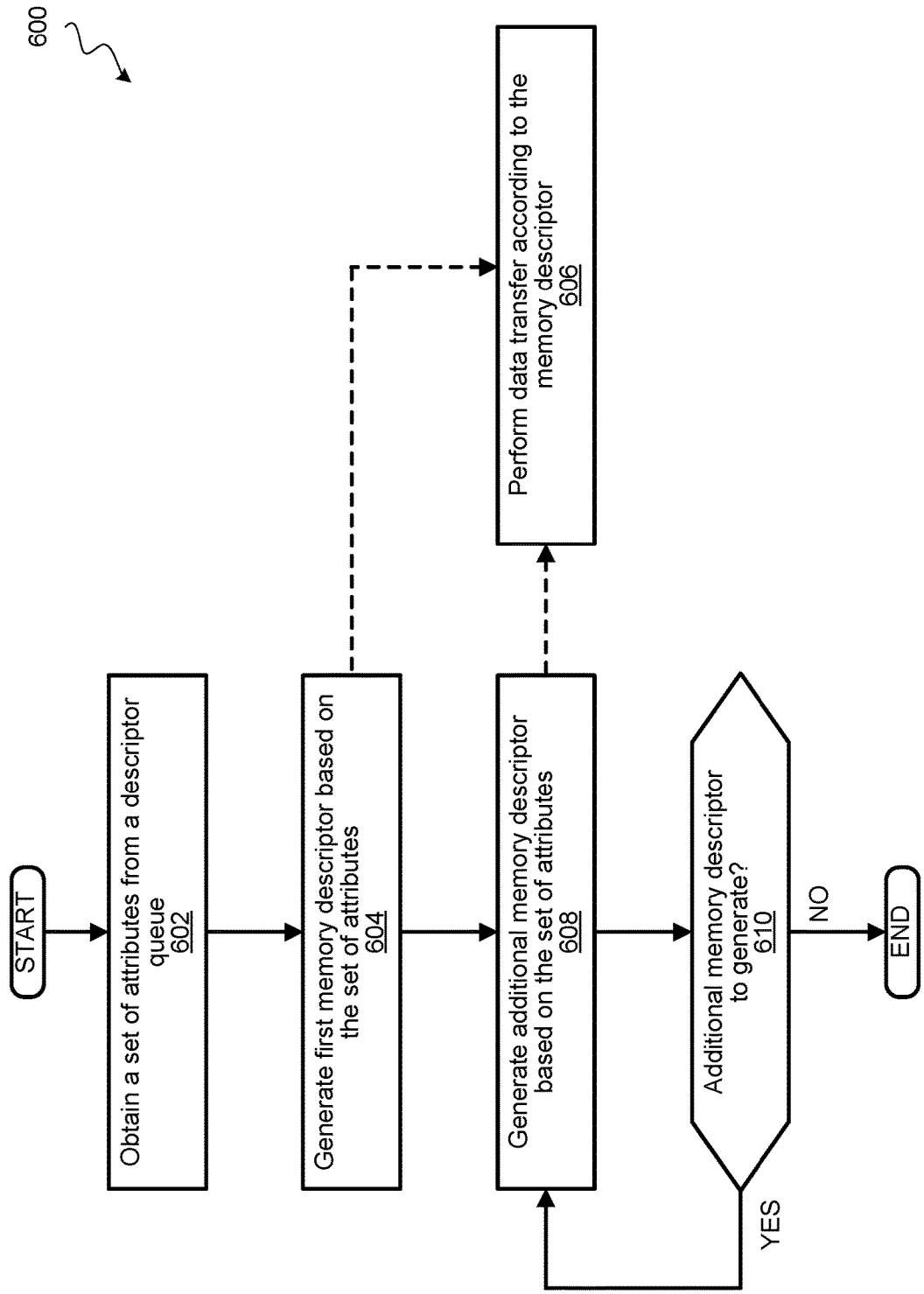
FIG. 6 illustrates a flow diagram of an example of a process to generate memory descriptors.

FIG. 6 illustrates a flow diagram of an example of a process 600 to generate memory descriptors by a DMA engine. Process 600 can be performed, for example, by DMA circuitry such as descriptor generation circuitry of a descriptor processing circuit (e.g., Tx descriptor processing circuit 214, Rx descriptor processing circuit 264). Process 600 may begin at block 602 by obtaining a set of attributes from a descriptor queue. The set of attributes may include a stride, a data transfer size (e.g., a data length), and a starting address. The stride can be an address offset value, or a multi-dimensional stride including a memory row offset value, a memory column offset value, and/or a memory partition offset value. The stride can be defined using a number of bits sufficient to span multiple components of a computing system (e.g., multiple accelerators). In some implementations, the stride can be defined using a number of bits sufficient to span the entire address range of the computing system.

The set of attributes can be obtained, for example, from one or more descriptors stored in the descriptor queue. By way of example, the stride can be obtained from a tensorized header descriptor retrieved from the descriptor queue, and the data transfer size and starting address can be obtained from a tensorized template descriptor retrieved from the descriptor queue. The tensorized template descriptor can be used as a base memory descriptor from which additional memory descriptors are generated. The tensorized header descriptor and/or the tensorized memory descriptor may include additional fields such as those described herein and/or other fields not specifically described. For example, the tensorized template descriptor may include a set of common fields (e.g., operation type, datatype, etc.) that are included in each memory descriptor being generated by process 600 according to the set of attributes.

At block 604, a first memory descriptor that includes the data transfer size and the starting address is generated based on the set of attributes. As mentioned above, a tensorized template can be used as a based memory descriptor. The first memory descriptor can be generated, for example, by modifying the descriptor type of the tensorized template to indicate a memory descriptor. In implementations that have a metadata field such as a last position indicator bit to indicate whether a descriptor is a last descriptor of a packet of descriptors, the metadata field can be cleared to indicate that the first memory descriptor generated at block 604 is not the last memory descriptor. The first memory descriptor may also include additional fields that are common to each of the memory descriptors being generate by process 600 as provided in the tensorized template descriptor.

Process 600 then branches to block 606 as indicated by the dotted arrow to perform a data transfer according to the first memory descriptor generated in block 604. For example, the data transfer can be performed by providing the first memory descriptor to a DMA interface to read or write the amount of data indicated by the data transfer size at the address indicated in the first memory descriptor.

Concurrently with the data transfer, process 600 proceeds to block 608 to generate another memory descriptor based on the attributes obtained in block 602. The memory descriptor generated at block 608 may include the data transfer size from the set of attributes and an address that is determined by offsetting the address from the previously generated memory descriptor (e.g., the starting address of the first memory descriptor) with the stride. In some implementations, the stride can be a multi-dimensional stride, and the address of the memory descriptor generated at block 608 can be offset, for example, according to a memory row offset and a memory column offset. In some implementations, the stride may further include a memory partition offset that is applied to the previous address to generate the address in the memory descriptor generated at block 608. The memory descriptor generated at block 608 may also include additional fields that are common with the first memory descriptor as provided in the tensorized template descriptor.

Process 600 then branches to block 606 to perform a data transfer according to the memory descriptor generated in block 608. For example, the data transfer can be performed by providing the memory descriptor generated in block 608 to a DMA interface to read or write the amount of data indicated by the data transfer size at the address indicated in the second memory descriptor.

At block 610, a determination is made as to whether any additional memory descriptor is to be generated. For example, in some implementations, the set of attributes obtained in block 602 may include a number of descriptors to generate. The number of descriptors can be provided, for example, in a field of the tensorized header descriptor. In some implementations, the number of descriptors to generate can be programmed into a configuration register of the DMA engine. If the number of memory descriptors that have been generated is below that number, process 600 can return to block 608 to generate an additional memory descriptor at block 608 and to perform an additional data transfer at block 606, and the process may repeat until the requested number of memory descriptors have been generated. In other words, process 600 may sequentially perform, for each additional memory descriptor to reach the number of memory descriptors, the operations of generating the additional memory descriptor to include the data transfer size and an address determined by offsetting the address of a previous memory descriptor with the stride, and performing a corresponding data transfer according to the generated memory descriptor.

If the number of memory descriptors that have been generated is equal to the requested number of descriptors, process 600 may end. In some implementations, the last memory descriptor of the number of memory descriptors being generated may include a metadata field such as a last position indicator bit that is set to indicate that this memory descriptor is the final memory descriptor being generated according to the set of attributes. The DMA engine may then proceed to retrieve the next descriptor from the descriptor queue to process. For example, if the next descriptor obtained from the descriptor queue is a memory descriptor (e.g., a memory descriptor that the descriptor generation circuitry did not generate), the DMA engine can forward the memory descriptor to the DMA interface to perform a data transfer according to the memory descriptor obtained from the descriptor queue. If the next descriptor is a tensorized descriptor, process 600 can be restarted.

Figure 7:
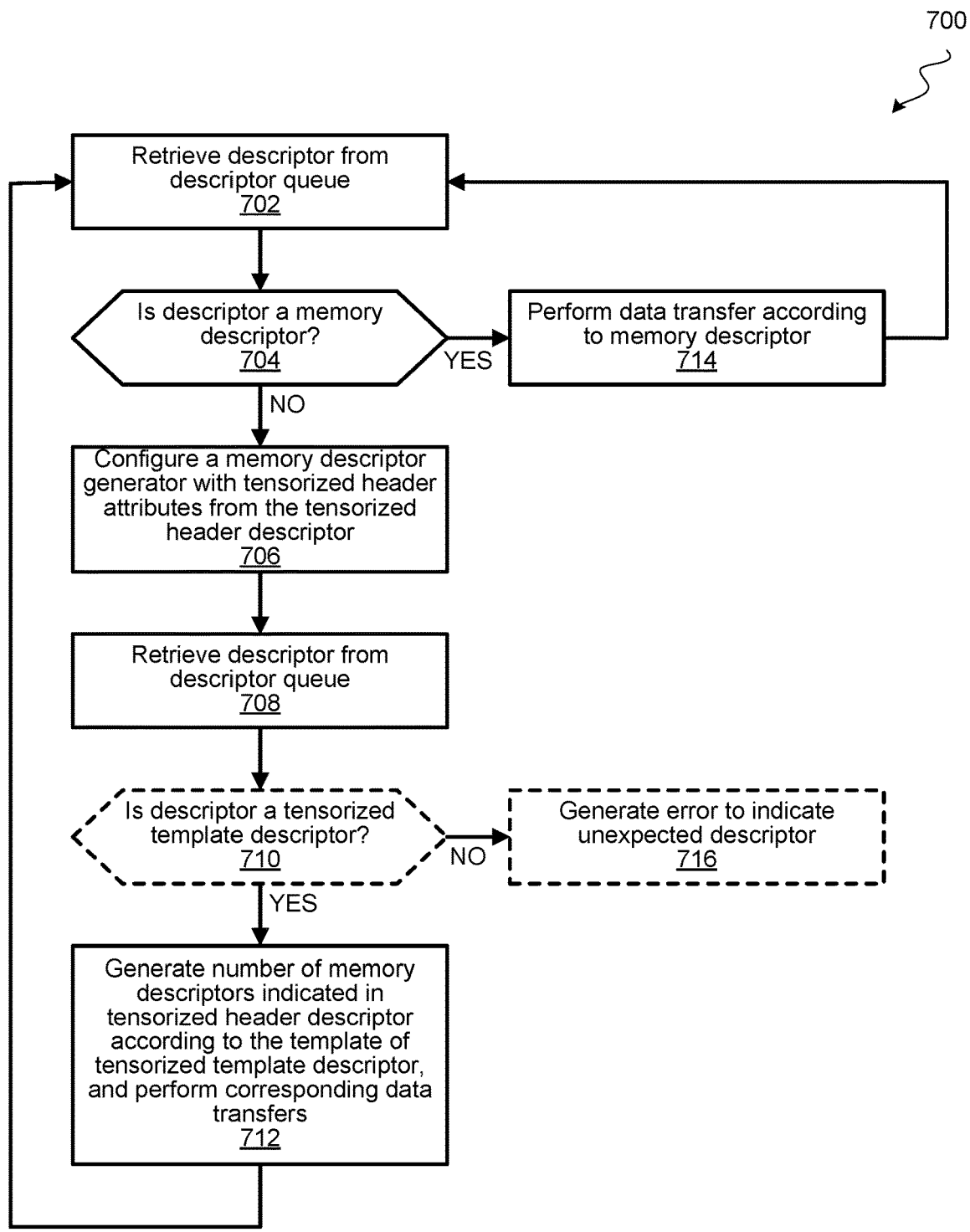
FIG. 7 illustrates a flow diagram of an example of a process for processing descriptors.

FIG. 7 illustrates a flow diagram of an example of a process 700 to process descriptors by a DMA engine. Aspects of process 700 can be performed, for example, by DMA circuitry such as a descriptor processing circuit (e.g., Tx descriptor processing circuit 214, Rx descriptor processing circuit 264) of a DMA engine. Process 700 may begin at block 702 by retrieving a descriptor from a descriptor queue. At block 704, a determination is made as to whether the descriptor is a memory descriptor or a tensorized header descriptor. The determination at block 704 can be made, for example, by parsing the descriptor to obtain the descriptor type of the descriptor. If it is determined that the descriptor is a tensorized header descriptor, process 700 proceeds to block 706. If it is determined that the descriptor is a memory descriptor, process 700 proceeds to block 714 to perform a data transfer according to the memory descriptor, and then returns to block 702 to obtain the next descriptor from the descriptor queue.

At block 706, in response to retrieving a tensorized header descriptor, a memory descriptor generator is configured with tensorized header attributes provided by the tensorized header descriptor. For example, the tensorized header attributes may include a number of memory descriptors to generate and a stride value. These attributes can be stored by the memory descriptor generator, and be used to generate a series of memory descriptors.

At bock 708, the next descriptor is retrieved from the descriptor queue. Optionally, at block 710, a determination is made as to whether the descriptor is a tensorized template descriptor, for example, by parsing the descriptor to obtain the descriptor type of the descriptor. If it is determined that the descriptor is not a tensorized template descriptor, then at optional block 716, an error signal can be generated to indicate an unexpected descriptor has been retrieved. The error signal can be used, for example, to discard the retrieved descriptor and to reset the memory descriptor generator. In some implementations, after the error handling has been performed for the unexpected descriptor, process 700 may return to block 702 to retrieve the next descriptor. In some implementations, blocks 710 and 716 can be omitted.

If the descriptor retrieve at block 708 is verified to be a tensorized template descriptor (or if blocks 710 and 716 are omitted), then process 700 proceeds to block 712 to use the memory descriptor generator to generate a number of memory descriptors as indicated in the tensorized header descriptor according to a template of the tensorized template descriptor, and to perform the corresponding data transfers based on the generated memory descriptors. Each of the generated memory descriptors has a data transfer size as provided in the tensorized template descriptor, and an address that is determined based on a starting memory address provided in the tensorized template descriptor and the stride value provided in the tensorized header descriptor. For example, the address of each successive memory descriptor being generated can be determined by offsetting the address of the previous memory descriptor by the stride value. The memory descriptors can be generated, for example, by using a process similar to that of process 600. In some implementations, each of the generated memory descriptors may include a metadata field such as a last position bit field, and only the last of the generated memory descriptors has the last position bit field set if this last memory descriptor is the last memory descriptor of a descriptor packet. Upon completion of generating the number of requested memory descriptors, process 700 may return to block 702 to retrieve the next descriptor from the descriptor queue.

Figure 8:
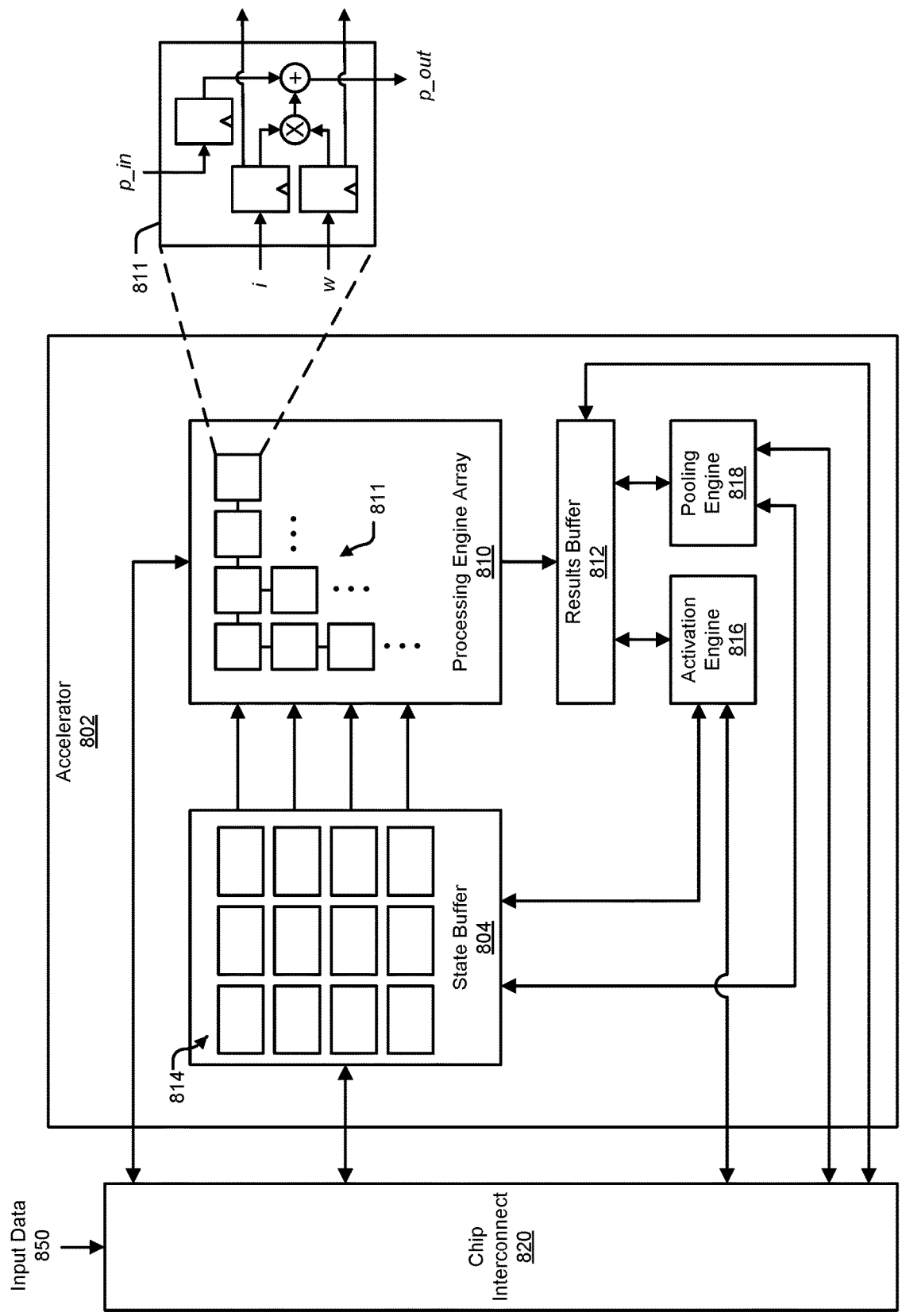
FIG. 8 illustrates a block diagram of an example of an integrated circuit device.

FIG. 8 is a block diagram illustrating an example of an integrated circuit device that can include accelerator 802 (e.g., any of accelerator 102-1 to 102-N), which for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814 and may be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
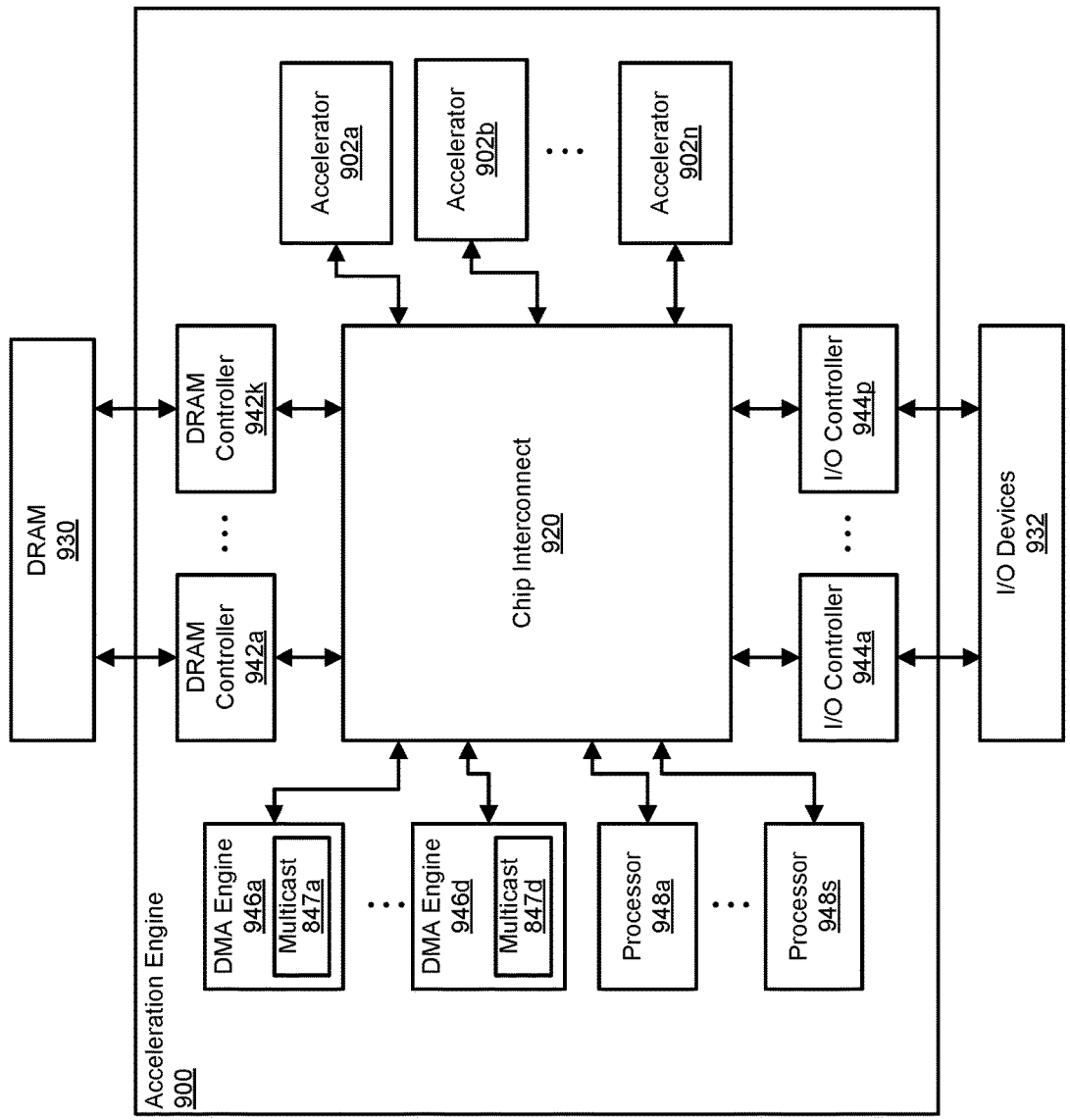
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the accelerators 902a-902n is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueuing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
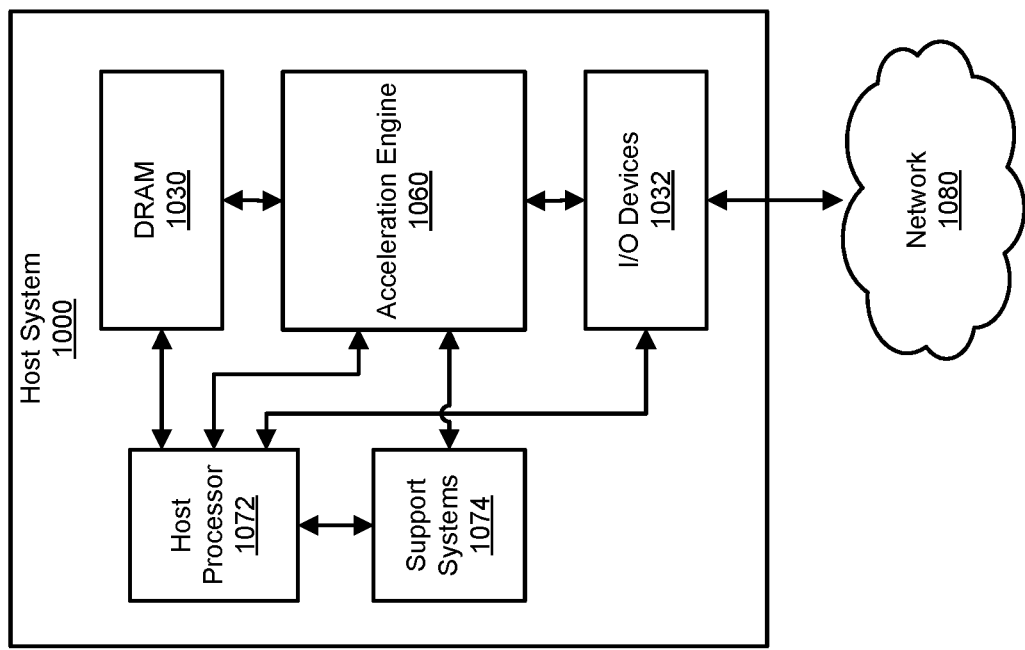
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks.

Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for operating a direct memory access engine, the method comprising:
    retrieving a first descriptor from a descriptor queue;
    determining that the first descriptor is a tensorized header descriptor;
    configuring a memory descriptor generator with tensorized header attributes from the tensorized header descriptor, the tensorized header attributes including a number of memory descriptors to generate and a stride value;
    retrieving a second descriptor from the descriptor queue;
    verifying that the second descriptor is a tensorized template descriptor;
    using the memory descriptor generator to generate the number of memory descriptors indicated in the tensorized header descriptor according to a template of the tensorized template descriptor, each of the generated memory descriptors having:
        an address determined based on a starting memory address provided in the tensorized template descriptor and the stride value from the tensorized header descriptor; and
        a data transfer size provided in the tensorized template descriptor; and
    performing data transfers according to the generated memory descriptors.

2. The method of claim 1, wherein each of the generated memory descriptors includes a metadata field to indicate whether a generated memory descriptor is a last descriptor of a descriptor packet.

3. The method of claim 1, wherein the stride value is defined using a number of bits that spans a full address range of a computing system.

4. The method of claim 3, wherein the generated memory descriptors include a first descriptor having a first address mapped to a first neural network accelerator and a second memory descriptor having a second address mapped to a second neural network accelerator.

5. A method comprising:
    obtaining, by direct memory access (DMA) circuitry, a set of attributes from a descriptor queue, the set of attributes including a stride, a data transfer size, and a starting address;
    generating, by the DMA circuitry, a first memory descriptor that includes the data transfer size and the starting address;
    performing, by the DMA circuitry, a first data transfer according to the first memory descriptor;
    generating, by the DMA circuitry, a second memory descriptor that includes the data transfer size and an address determined by offsetting the starting address with the stride; and
    performing, by the DMA circuitry, a second data transfer according to the second memory descriptor.

6. The method of claim 5, wherein the set of attributes further includes a number of memory descriptors to generate, and the method further comprises:
    sequentially performing for each additional memory descriptor to reach the number of memory descriptors:
        generating, by the DMA circuitry, the additional memory descriptor that includes the data transfer size and an address determined by offsetting an address of a previous memory descriptor with the stride; and
        performing, by the DMA circuitry, a corresponding data transfer according to the additional memory descriptor.

7. The method of claim 6, wherein a last memory descriptor of the number of memory descriptors includes a metadata field indicating that the last memory descriptor is a final memory descriptor being generated according to the set of attributes.

8. The method of claim 6, further comprising:
    obtaining, by the DMA circuitry, a memory descriptor from the descriptor queue; and
    performing, by the DMA circuitry, a data transfer according to the memory descriptor obtained from the descriptor queue.

9. The method of claim 6, wherein the number of memory descriptors to generate and the stride are obtained from a tensorized header descriptor.

10. The method of claim 6, wherein the data transfer size and the starting address are obtained from a tensorized template descriptor.

11. The method of claim 10, wherein the tensorized template descriptor includes a set of common fields that are included in each memory descriptor being generated by the DMA circuitry according to the set of attributes.

12. The method of claim 11, wherein the set of common fields includes an operation type and a datatype.

13. The method of claim 5, wherein the stride is a two-dimensional stride indicating a memory row offset and a memory column offset.

14. The method of claim 5, wherein the stride is a three-dimensional stride indicating a memory partition offset, a memory row offset, and a memory column offset.

15. An integrated circuit device comprising:
    a data buffer;
    a direct memory access (DMA) interface operable to transfer data between the data buffer and a component of a computing system; and
    a descriptor processing circuit operable to:
        obtain a tensorized descriptor including a header and a template from a descriptor queue;
        generate a plurality of memory descriptors having the template of the tensorized descriptor according to attributes in the header; and
        provide the DMA interface with each of the plurality of memory descriptors to perform data transfers according to the plurality of memory descriptors.

16. The integrated circuit device of claim 15, wherein the attributes include a number of descriptors to generate and a stride.

17. The integrated circuit device of claim 16, wherein the descriptor processing circuit includes:

a counter operable to count a number of memory descriptors being generated; and an address generator circuit operable to compute an address for a current memory descriptor being generated by offsetting an address of a previous memory descriptor with the stride.

18. The integrated circuit device of claim 17, wherein the descriptor processing circuit is operable to set a metadata field in a final memory descriptor of the plurality of memory descriptors.

19. The integrated circuit device of claim 15, wherein each of the plurality of memory descriptors includes a set of common fields provided in the template of the tensorized descriptor.

20. The integrated circuit device of claim 15, wherein the descriptor processing circuit is operable to:
   obtain a second descriptor from the descriptor queue;
   determine that the second descriptor is a memory descriptor; and
   provide the second descriptor to the DMA interface to transfer data according to the second descriptor.

\* \* \* \* \*